United States Patent
Grewing et al.

(10) Patent No.: US 7,239,854 B2
(45) Date of Patent: Jul. 3, 2007

(54) FREQUENCY-DOUBLING CIRCUIT ARRANGEMENT, AND MOBILE RADIO HAVING THAT CIRCUIT ARRANGEMENT

(75) Inventors: Christian Grewing, Sollentuna (SE); André Hanke, Düsseldorf (DE); Dietolf Seippel, Bottrop (DE)

(73) Assignee: Infineon Technologies AG, Munich (DE)

( * ) Notice: Subject to any disclaimer, the term of this patent is extended or adjusted under 35 U.S.C. 154(b) by 329 days.

(21) Appl. No.: 10/940,103

(22) Filed: Sep. 14, 2004

(65) Prior Publication Data

US 2005/0090220 A1    Apr. 28, 2005

Related U.S. Application Data

(63) Continuation of application No. PCT/DE03/00477, filed on Feb. 17, 2003.

(30) Foreign Application Priority Data

Mar. 15, 2002    (DE) ................. 102 11 523

(51) Int. Cl.
*H04B 1/04*    (2006.01)
*H04B 1/18*    (2006.01)

(52) U.S. Cl. ............ 455/112; 455/190.1; 455/130

(58) Field of Classification Search ........... 455/112, 455/20, 118, 130, 131, 165.1, 190.1; 327/119, 327/122
See application file for complete search history.

(56) References Cited

U.S. PATENT DOCUMENTS

| | | | | |
|---|---|---|---|---|
| 4,639,679 A | * | 1/1987 | Kasperkovitz et al. ...... | 327/122 |
| 5,434,522 A | * | 7/1995 | Fikart et al. ................. | 327/122 |
| 5,581,210 A | * | 12/1996 | Kimura ...................... | 327/355 |
| 5,826,183 A | * | 10/1998 | Apel .......................... | 455/326 |
| 6,480,046 B1 | * | 11/2002 | Camp, Jr. ................... | 327/122 |
| 6,664,814 B1 | * | 12/2003 | Evans et al. ................. | 327/65 |
| 6,664,824 B2 | * | 12/2003 | Laws ......................... | 327/122 |
| 6,836,180 B1 | * | 12/2004 | Kwok ........................ | 327/552 |
| 6,882,191 B2 | * | 4/2005 | Kwok ........................ | 327/122 |
| 2003/0017812 A1 | * | 1/2003 | Arimura ..................... | 455/112 |

FOREIGN PATENT DOCUMENTS

JP    10-004683 A    1/1998

OTHER PUBLICATIONS

"A DC to X-Band Frequency Doubler Using GaAs HBT MMIC", Xiangdong Zhang and Yong-Hoon Yun, Microwave Symposium Digest, IEEE, Jun. 1997, pp. 1213-1216.
International Search Report, Int'l Application No. PCT/DE03/00477, 2 pgs.

* cited by examiner

*Primary Examiner*—Sonny Trinh
(74) *Attorney, Agent, or Firm*—Eschweiler & Associates, LLC

(57) ABSTRACT

One or more aspects of the present invention are directed to a frequency-doubling circuit arrangement that doubles the frequency of a signal applied to its input, and presents that doubled frequency signal at its output. A rectifier that rectifies the input signal as a function of a reference variable is provided for coupling the input and output. A regulator is used to supply the reference variable to a control input of the rectifier. A control loop is designed so that even-numbered higher harmonics in the output signal disappear or are greatly suppressed. Since the frequency-doubling circuit described has a low power consumption in conjunction with a smaller chip area, it is particularly suitable for installation in mobile radios for conditioning carrier frequencies and local oscillator frequencies.

18 Claims, 1 Drawing Sheet

FREQUENCY-DOUBLING CIRCUIT ARRANGEMENT, AND MOBILE RADIO HAVING THAT CIRCUIT ARRANGEMENT

REFERENCE TO RELATED APPLICATIONS

This application is a continuation of PCT/DE03/00477, filed Feb. 17, 2003 which was not published in English, that claims the benefit of the priority date of German Patent Application No. DE 102 11 523.0, filed on Mar. 15, 2002, the contents of both of which are herein incorporated by reference in their entirety.

FIELD OF THE INVENTION

The present invention relates to a frequency-doubling circuit arrangement as well as to a mobile radio having that circuit arrangement.

BACKGROUND OF THE INVENTION

Frequency conversion between baseband and a radio-frequency radio channel is normally required both in mobile radio transmitters and in mobile radio receivers. A frequency mixer is used in homodyne transmitting arrangements, for example, to convert a baseband modulation signal to a radio frequency in the Gigahertz band. A carrier frequency which corresponds to the desired transmission frequency is required for this purpose.

The carrier frequency is normally provided by a voltage-controlled oscillator which does not, however, oscillate at the transmission frequency but rather at a frequency which is different than the transmission frequency. Said frequency is selected in such a manner that it can be converted to the transmission frequency with as little effort as possible. Selecting an oscillation frequency other than the transmission frequency diminishes the effects of the transmission frequency on the oscillator. The performance of the voltage-controlled oscillator may additionally be improved if the oscillator frequency is selected to be lower than the transmission frequency. The oscillator may oscillate, for example, at half the transmission frequency in order to ensure a low power consumption and good phase noise characteristics. A frequency-doubling circuit which converts the oscillator frequency to the desired carrier frequency—corresponding, in this example, to the transmission frequency—is therefore required.

Similarly, a frequency-doubling circuit may also be used, in receiving arrangements for converting a received radio frequency to baseband or an intermediate frequency, to provide a radio-frequency so-called local oscillator signal from an oscillator signal.

The frequency-doubling operation described is normally effected by means of a radio-frequency mixer having two inputs which are both connected to the oscillator and square the oscillator signal at the output of the mixer. For this purpose, the oscillator signal is split, by means of a phase shifter, into two signal components (which are orthogonal to one another) and is up-mixed to the desired transmission frequency. An output signal at twice the oscillator frequency is then available at the output of the mixer on account of the signal-squaring operation described. In addition to a radio-frequency mixer, the known frequency-doubling circuit therefore requires a phase shifter for producing orthogonal signal components.

The document JP 10-004683 A specifies a rectifier circuit for processing a single-ended signal. An operational amplifier which forms the output of the circuit is provided. The output is fed back to the input connection via resistors. In addition, an external reference signal is supplied.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

According to one or more aspects of the present invention, a frequency-doubling circuit arrangement is disclosed as well as a mobile radio having that circuit arrangement. The circuit arrangement makes it possible to double a frequency with little effort, low power consumption and good noise characteristics.

An exemplary frequency-doubling circuit arrangement comprises an input terminal pair for supplying an input signal at an input frequency, and an output terminal pair from which an output signal at twice the input frequency can be tapped off. The arrangement further includes a rectifier which couples the input terminal pair to the output terminal pair and facilitates rectifying the input signal as a function of a reference variable, and a regulating device having a regulator input which is coupled to the output terminal pair and having a regulator output which is coupled to a control input of the rectifier for supplying the reference variable. The regulating device is designed to regulate the reference variable of the output signal in such a manner that even-numbered higher harmonic frequency components in the spectrum of the output signal disappear or are greatly reduced. Similarly, the rectifier is designed so that the input signal and the reference variable are used to drive different transistors which together form a differential amplifier.

In accordance with the present principle, an input signal at an input frequency, for example at the frequency of a voltage-controlled oscillator which is connected to the input terminal pair, is supplied to the input terminal pair. The frequency of said signal is doubled by means of the circuit arrangement described, and the doubled output frequency is provided at the output terminal pair of the circuit arrangement. The rectifier rectifies the input signal, initially without smoothing and filtering but as a function of a reference variable. In this case, when considered diagrammatically, the lower half-cycles of the input signal are convolved upward, so that a signal at twice the frequency is now available, following this rectification step, at the output of the rectifier and therefore at the output terminal pair. Said signal would, however, have higher harmonic frequency components. In the case of full-wave rectification which is preferably provided, even-numbered higher harmonic frequency components, in particular, would be dominant in the frequency spectrum of the output signal. The regulating device which acts, from the output terminal pair, on a control input of the rectifier reduces these even-numbered higher harmonic frequency components in the spectrum of the output signal by regulating the rectification reference variable. For this purpose, the DC component of the output signal, for example in the form of a common-mode signal, is preferably evaluated and supplied, as reference variable, to a control input of the rectifier.

When the circuit arrangement is dimensioned in a suitable manner, the undesirable higher harmonics, in particular the even-numbered higher harmonic frequency components in the spectrum of the output signal, are reduced or eliminated. In the present principle, the performance of the frequency-doubling operation corresponds to that of squaring the oscillator signal (explained initially). In the present principle, however, the power consumption is 3 to 5 times lower than in the latter principle, and the simple design which is possible using few components additionally makes it possible to halve the requisite chip area when in the form of an integrated circuit.

The input terminal pair is preferably designed to supply an input signal which is in the form of a balanced or differential voltage signal. The output terminal pair is preferably designed to provide a signal in the form of a balanced or differential current signal.

The regulating device is preferably designed to provide the reference variable as a function of a difference signal which can be tapped off between the two output terminals of the output terminal pair. By way of example, the regulating device is preferably designed in such a manner that, as regards illustrating the signal in a diagram, the reference variable divides the rectified signal such that it has the integral over the course of time. In this case, the reference variable is preferably a DC (direct current) signal.

The rectifier is preferably in the form of a full-wave rectifier. Full-wave rectifiers have the advantage over half-wave rectifiers of a lower hum voltage and a higher hum frequency. In this case, the second and further even-numbered higher harmonics form the major proportion of the hum voltage.

In accordance with another exemplary aspect of the present invention, a stabilizing device is provided for the purpose of stabilizing the reference variable (which is in the form of a DC signal) over the course of time. In this case, the stabilizing device is connected to the regulator output and thus to the control input of the rectifier as well.

The rectifier is constructed, for example, using two differential amplifiers which each comprise a transistor pair having a first and a second transistor. In this case, the controlled paths of the two first transistors are connected in parallel with one another, and the controlled paths of the two second transistors are likewise connected in parallel with one another. The control connections of the two first transistors form the input terminal pair in the circuit arrangement, while the control connections of the two second transistors are connected to one another and to the control input of the rectifier. A rectifier of this type can be implemented using both bipolar circuitry and CMOS or BICMOS circuitry and is distinguished by a small area requirement, a low power consumption and a simple design.

The regulating device is, for example, an operational amplifier having an inverting and a non-inverting input which are each connected to an output terminal of the output terminal pair in the circuit arrangement. The operational amplifier furthermore has an output which is connected to the control input of the rectifier.

The operational amplifier detects the DC component of the output signal and advantageously feeds it as rectification reference variable to the rectifier.

The circuit arrangement is preferably designed to process a signal which can be supplied to the input terminals and whose frequency contains the useful information. This is the case, in particular, with mobile radios in which the frequency-doubling circuit described is used to condition an oscillator signal. In this case, it is not important for the functionality of the circuit arrangement in accordance with the inventive principle whether the input signal for the frequency-doubling circuit is merely a carrier signal or is itself a modulated radio-frequency signal.

A mobile radio having a circuit arrangement according to one or more aspects of the present invention comprises at least one device for frequency conversion between a radio frequency and a baseband signal, wherein the device has an auxiliary input for supplying a signal at a carrier frequency. The radio further includes a frequency generator which provides a reference signal at a reference frequency at an output, and a frequency-doubling circuit arrangement whose input terminal pair is coupled to the output of the frequency generator and whose output terminal pair is coupled to the auxiliary input of the device for frequency conversion.

The advantages of the present circuit arrangement, namely a considerably reduced power consumption, a considerably reduced chip area and good noise characteristics of the frequency-doubled signal, advantageously are useful in mobile radios, in particular, for obvious reasons.

In addition, doubling the frequency of a wanted signal between the frequency generator and frequency converter makes it possible for the oscillator to operate without reactions and makes it possible to provide an oscillator having a low power consumption and good phase noise characteristics, inter alia on account of the reduced oscillation frequency.

BRIEF DESCRIPTION OF THE DRAWINGS

The invention is explained in more detail below using a plurality of exemplary embodiments and with reference to the drawings, in which.

DETAILED DESCRIPTION OF THE INVENTION

Figure 1:
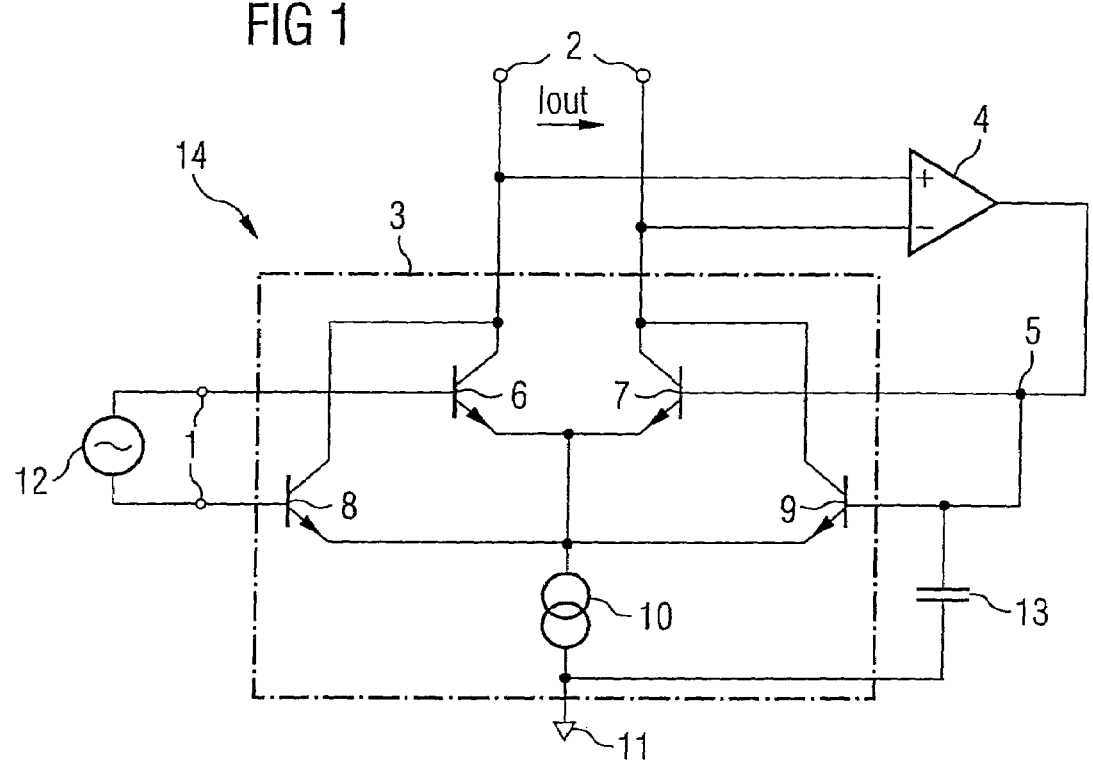
FIG. 1 is a simplified circuit diagram illustrating one exemplary embodiment of a circuit arrangement according to one or more aspects of the present invention, and FIG. 2 schematically illustrates a mobile radio having a circuit arrangement as shown in FIG. 1.

FIG. 1 illustrates an exemplary frequency-doubling circuit arrangement according to one or more aspects of the present invention. In the illustrated example, a rectifier 3 is connected between an input terminal pair 1 for supplying an input signal at an input frequency and an output terminal pair 2 from which an output signal at twice the input frequency can be tapped off. The rectifier 3 is designed to rectify the input signal as a function of a reference variable. A regulating device 4 which has a regulator input—which is coupled to the output terminal pair 2—and whose output is coupled to a control input 5 of the rectifier 3 (for the purpose of supplying the reference variable) is provided for the purpose of providing said reference variable. The input terminal pair 1 and output terminal pair 2 are each designed symmetrically to carry differential signals. The regulator 4 is in the form of an operational amplifier having a non-inverting input and an inverting input which are each connected to a connecting terminal of the output terminal pair 2. The rectifier 3 itself comprises two differential amplifiers which each comprise a pair of emitter-coupled transistors 6, 7; 8, 9. Each differential amplifier comprises a first transistor 6, 8 and a second transistor 7, 9. The NPN bipolar transistors 6, 7 in the first differential amplifier are coupled to one another by their emitter connections and are coupled to a reference potential connection 11 via a supply current source 10. The common emitter connections of the NPN bipolar transistors in the second differential amplifier 8, 9 are connected to the emitter connections of the first differential amplifier 6, 7. The collectors of the first transistors 6, 8 in the two differential amplifiers are each connected to one another and to an output terminal of the output terminal pair 2; the collector connections of the second transistors 7, 9 in the two differential amplifiers are likewise connected to one another and to the further output terminal connection of the output terminal pair 2. The two base connections of the first transistors 6, 8 form the balanced input terminal pair 1. An oscillator 12 which emits the input signal at the input frequency is connected to the input terminal pair 1. The control input 5 of the rectifier 3 is connected to the base connections of the second transistors 7, 9 in the differential amplifiers and is furthermore connected to the reference potential connection 11 via a stabilizing capacitance 13.

The rectifier 3 is used to rectify a so-called differential input signal which is applied to the input 1. The rectifier described operates in this case as a full-wave rectifier. The regulator 4 is used to largely suppress the second and further even-numbered higher harmonics which are normally produced during full-wave rectification. This is achieved by the regulator 4 readjusting the reference potential (which is supplied to the control input 5 of the rectifier 3) as a function of the output signal produced at the output. The signal at twice the frequency of the input signal is produced as a differential or balanced signal at the output of the rectifier 3, that is to say at the output 2 of the circuit arrangement.

The present frequency-doubling circuit requires 3 to 5 times less operating current than conventional frequency doubler circuits (which square signals) and can be integrated on half the chip area.

Figure 2:
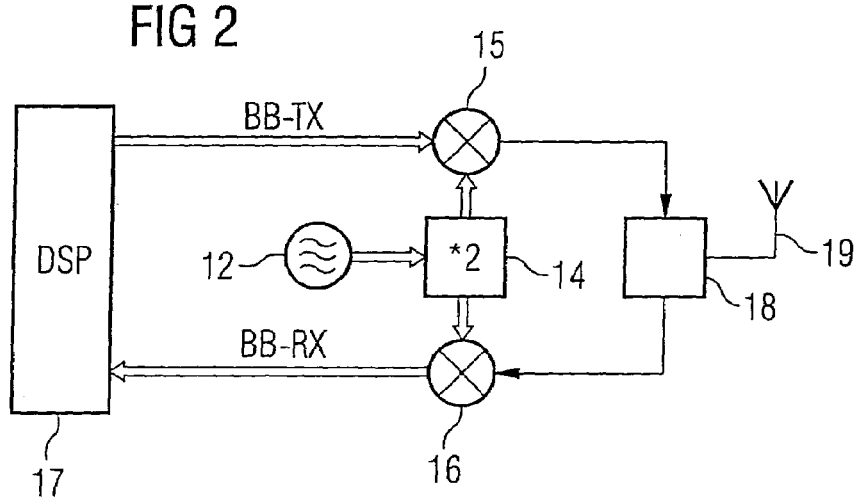

FIG. 2 shows a mobile radio having the frequency-doubling circuit arrangement which is shown in FIG. 1 and is provided there with reference symbol 14. In this case, a step-up frequency mixer 15 is provided in a transmission path, and a step-down frequency mixer 16 is provided in a reception path of the mobile radio. The step-up frequency converter 15 has a modulation input for supplying a baseband modulation signal BB-TX and is coupled to a digital signal processor 17 which provides the baseband modulation signal. The modulation signal is available as a modulated carrier (that has been converted to a radio frequency) at the output of the step-up frequency converter 15. The output of the step-up frequency mixer 15 is coupled to a duplexing unit 18 which in turn is bidirectionally connected to an antenna 19. One output of the duplexing unit 18 is furthermore connected, in the receiving direction, to a radio-frequency input of the step-down frequency mixer 16 for supplying a radio-frequency received signal. The output of the step-down frequency mixer 16 is connected to an input of the digital signal processor 17, to which a demodulated received signal which has been down-mixed to baseband is supplied in this case. A voltage-controlled oscillator 12 which may also comprise a phase-locked loop is provided for the purpose of driving the frequency mixers 15, 16 with a carrier signal. This voltage-controlled oscillator 12 is connected to an auxiliary input of each of the mixers 15, 16 via the frequency-doubling circuit arrangement 14. Twice the oscillation frequency of the oscillator 12 is therefore supplied to the auxiliary inputs of the mixers 15, 16.

The characteristics of the present frequency-doubling unit, such as low power consumption and small chip area, are of particular importance in mobile applications, in particular. The oscillator 12 may operate at half the oscillation frequency, so that further simplification of the circuit layout is ensured.

Instead of the direct conversion architecture of the mobile radio shown, heterodyne architectures as well as low IF architectures may advantageously, in particular as regards the reception path of the transceiver shown in FIG. 2, also be equipped with the frequency-doubling circuit according to one or more aspects of the present invention.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising." Also, exemplary is merely intended to mean an example, rather than the best.

The invention claimed is:

1. A frequency-doubling circuit arrangement comprising:
   an input terminal pair for supplying an input signal at an input frequency;
   an output terminal pair from which an output signal at twice the input frequency can be tapped off,
   a rectifier which couples the input terminal pair to the output terminal pair and is intended to rectify the input signal as a function of a reference variable, and
   a regulating device having a regulator input which is coupled to the output terminal pair and having a regulator output which is coupled to a control input of the rectifier for supplying the reference variable, the regulating device regulating the reference variable of the output signal so that even-numbered higher harmonic frequency components in the spectrum of the output signal disappear or are greatly reduced, with the rectifier designed so that the input signal and the reference variable drive different transistors which together form a differential amplifier.

2. The circuit arrangement of claim 1, wherein the regulating device provides the reference variable as a function of a difference signal which can be tapped off between two output terminals of the output terminal pair.

3. The circuit arrangement of claim 1, wherein the rectifier is a full-wave rectifier.

4. The circuit arrangement of claim 1, further comprising:
   a stabilizing device connected to the regulator output to stabilize the reference variable over time.

5. The circuit arrangement of claim 4, wherein the stabilizing device comprises one or more capacitors.

6. The circuit arrangement of claim 1, wherein the rectifier comprises:

two transistor pairs which are each connected as differential amplifiers and each comprise a first transistor and a second transistor, wherein
control paths of the two first transistors are connected in parallel with one another,
control paths of the two second transistors are connected in parallel with one another,
the input terminal pair of the circuit arrangement is connected to the two control paths of the first transistors, and
the control input of the rectifier is connected to the two control paths of the second transistors.

7. The circuit arrangement of claim 1, wherein the regulating device comprises:
an operational amplifier having two inputs which are connected to the output terminal pair of the circuit arrangement and having an output which is connected to the control input of the rectifier.

8. The circuit arrangement of claim 1, wherein the circuit arrangement processes a signal which can be supplied to the input terminal pair and whose frequency contains useful information.

9. The circuit arrangement of claim 1, wherein the reference variable is in the form of a DC signal.

10. A mobile radio device, comprising:
at least one device for frequency conversion between a radio frequency and a baseband signal, the at least one device having an auxiliary input for supplying a signal at a carrier frequency;
a frequency generator which provides a reference signal at a reference frequency at an output;
a frequency-doubling circuit arrangement for frequency conversion comprising:
an input terminal pair coupled to the output of the frequency generator; and
an output terminal pair coupled to the auxiliary input of the at least one device;
a rectifier which couples the input terminal pair to the output terminal pair and is intended to rectify the input signal as a function of a reference variable, and
a regulating device having a regulator input which is coupled to the output terminal pair and having a regulator output which is coupled to a control input of the rectifier for supplying the reference variable, the regulating device regulating the reference variable of the output signal so that even-numbered higher harmonic frequency components in the spectrum of the output signal disappear or are greatly reduced, with the rectifier designed so that the input signal and the reference variable drive different transistors which together form a differential amplifier.

11. The device of claim 10, wherein the regulating device provides the reference variable as a function of a difference signal which can be tapped off between two output terminals of the output terminal pair.

12. The device of claim, 10 wherein the rectifier is a full-wave rectifier.

13. The device of claim 10, further comprising:
a stabilizing device connected to the regulator output to stabilize the reference variable over time.

14. The device of claim 13, wherein the stabilizing device comprises one or more capacitors.

15. The device of claim 10, wherein the rectifier comprises:
two transistor pairs which are each connected as differential amplifiers and each comprise a first transistor and a second transistor, wherein
control paths of the two first transistors are connected in parallel with one another,
control paths of the two second transistors are connected in parallel with one another,
the input terminal pair of the circuit arrangement is connected to the two control paths of the first transistors, and
the control input of the rectifier is connected to the two control paths of the second transistors.

16. The device of claim 10, wherein the regulating device comprises:
an operational amplifier having two inputs which are connected to the output terminal pair of the circuit arrangement and having an output which is connected to the control input of the rectifier.

17. The device of claim 10, wherein the circuit arrangement processes a signal which can be supplied to the input terminal pair and whose frequency contains useful information.

18. The device of claim 10, wherein the reference variable is in the form of a DC signal.

* * * * *